US010360396B2

(12) United States Patent
Major et al.

(10) Patent No.: US 10,360,396 B2
(45) Date of Patent: Jul. 23, 2019

(54) TOKEN-BASED CONTROL OF SOFTWARE INSTALLATION AND OPERATION

(71) Applicant: BlackBerry Limited, Waterloo (CA)

(72) Inventors: Daniel Jonas Major, Ottawa (CA); Michael Alievsky, Ottawa (CA); Robert David Turner, Kanata (CA); Adam Richard Schieman, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 229 days.

(21) Appl. No.: 14/928,515

(22) Filed: Oct. 30, 2015

(65) Prior Publication Data
US 2017/0116427 A1    Apr. 27, 2017

Related U.S. Application Data

(60) Provisional application No. 62/247,148, filed on Oct. 27, 2015.

(51) Int. Cl.
*G06F 21/00* (2013.01)
*H04L 29/06* (2006.01)
(Continued)

(52) U.S. Cl.
CPC ............ *G06F 21/6209* (2013.01); *G06F 8/63* (2013.01); *G06F 21/51* (2013.01); *G06F 21/57* (2013.01); *G06F 2221/033* (2013.01)

(58) Field of Classification Search
CPC ...... G06F 21/6209; G06F 21/57; G06F 21/51; G06F 8/63; G06F 2221/033
See application file for complete search history.

(56) References Cited

U.S. PATENT DOCUMENTS

2002/0029350 A1* 3/2002 Cooper ................. G06Q 10/10
726/26
2006/0212270 A1* 9/2006 Shiu ...................... H04L 63/126
702/188
(Continued)

FOREIGN PATENT DOCUMENTS

WO    WO-2018101904 A1 *  6/2018 .......... H04L 9/0897

OTHER PUBLICATIONS

Julian Horsch, Sascha Wessel, Claudia Eckert; "CoKey: fast token-based cooperative cryptography"; Dec. 2016; ACSAC '16: Proceedings of the 32nd Annual Conference on Computer Security Applications; Publisher: ACM; pp. 314-323 (Year: 2016).*

(Continued)

*Primary Examiner* — Kendall Dolly
*Assistant Examiner* — Courtney D Fields
(74) *Attorney, Agent, or Firm* — Rowand LLP (57) ABSTRACT

Described are a method and system of authorizing software execution on a computing device having a processor, the device storing a production key associated with software authorized for end-user release and storing a pre-release key associated with software not authorized for end-user release. The method includes determining that a signed software image is not signed with the production key; determining that the device has stored in memory thereon a pre-release token, the pre-release token containing data uniquely identifying the device and identifying the pre-release key; validating the pre-release token; and authenticating the signed software image using the pre-release key and, in response, permitting execution of the software image.

16 Claims, 6 Drawing Sheets

(51) Int. Cl.
  *G06F 21/51*   (2013.01)
  *G06F 21/57*   (2013.01)
  *G06F 21/62*   (2013.01)
  *G06F 8/61*    (2018.01)
  *H04L 9/32*        (2006.01)

(56) References Cited

U.S. PATENT DOCUMENTS

| | | | |
|---|---|---|---|
| 2009/0228704 A1* | 9/2009 | de Atley | G06F 8/20 |
| | | | 713/156 |
| 2009/0254753 A1 | 10/2009 | De Atley | |
| 2012/0054734 A1 | 3/2012 | Andrews et al. | |
| 2015/0288528 A1 | 10/2015 | Cho | |

OTHER PUBLICATIONS

Extended European Search Report dated Mar. 2, 2017.
IBM Rational—FlexNet Token based licensing_ OpenLM Software Licensing Blog (www.openlm.com/blog/ibm-rational-flexnet-token-based-licensing/).

* cited by examiner

TOKEN-BASED CONTROL OF SOFTWARE INSTALLATION AND OPERATION

CROSS-REFERENCE TO RELATED APPLICATIONS

The present application claims priority to U.S. provisional patent application Ser. No. 62/247,148 filed Oct. 27, 2015, entitled "Token-based Control of Software Installation and Operation", the contents of which are hereby incorporated by reference.

TECHNICAL FIELD

The present disclosure relates to computing device security and, in particular, to preventing unauthorized installation of software or access to unauthorized functions.

BACKGROUND

Software security issues present multiple challenges to computing device manufacturers. For example, when deploying a software update, whether for an application or an entire operating system, the software may go through multiple stages of readiness before it is ready for customer release, including development, internal Beta testing, external Beta testing, and carrier testing (in the case of mobile devices with cellular capability). Software that leaks early and is installed on customer devices can damage a corporate brand because it may be unstable or dangerous, can present a security risk due to unresolved bugs, and such leaks can undermine the timely and controlled release of product.

To prevent unauthorized installation of system software, consumer devices typically have a locked processor that will not boot software that is not signed with an authorized production key indicating that the software is valid, authentic manufacturer's software. To facilitate development of the software, the manufacturer often creates and controls a number of "insecure" devices that have unlocked processors that will boot unsigned software for use by developers. Minimizing and controlling the number of these devices from a security and cost management perspective may be a challenge. In some instances, the use of insecure devices is limited to those in core development or testing, with production devices being used for Beta testing or external carrier testing.

In another example, various functions or features of various components may be blocked in a production device for security reasons. Access to those functions or features may be advantageous during development and/or testing to evaluate code, diagnose problems and gauge performance. To gain access to those features the developer/tester may use an insecure device or a production device that runs an OS image that has fewer security restrictions. In some cases, this may be mean that the OS image being used during testing and evaluation is not exactly the same as the intended production release OS image, which can potentially undermine confidence in the testing and/or require careful controls to prevent mistaken release of the less secure OS image.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present application describes method of authorizing software execution on a computing device having a processor, the device storing a production key associated with software authorized for end-user release and storing a pre-release key associated with software not authorized for end-user release. The method includes determining that a signed software image is not signed with the production key; determining that the device has stored in memory thereon a pre-release token, the pre-release token containing data uniquely identifying the device and identifying the pre-release key; validating the pre-release token; and authenticating the signed software image using the pre-release key and, in response, permitting execution of the software image.

In another aspect, the present application describes a computing device. The computing device includes a memory storing a production key associated with software authorized for end-user release and storing a pre-release key associated with software not authorized for end-user release; a bootloader; and a processor to execute the bootloader. The bootloader, when executed, determines that a signed software image is not signed with the production key, determines that the device has stored in memory thereon a pre-release token, the pre-release token containing data uniquely identifying the device and identifying the pre-release key, validates the pre-release token, and authenticates the signed software image using the pre-release key and, in response, permitting execution of the software image.

In a further aspect, the present application discloses a non-transitory computer readable medium storing program instructions that, when executed, cause one or more processors to carry out one or more of the methods described herein.

Other example embodiments of the present disclosure will be apparent to those of ordinary skill in the art from a review of the following detailed descriptions in conjunction with the drawings.

In the present application, the term "and/or" is intended to cover all possible combination and sub-combinations of the listed elements, including any one of the listed elements alone, any sub-combination, or all of the elements, and without necessarily including additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

As noted above, controlling access to and operation of software is a security issue for computing device manufacturers. In many cases, a consumer-ready production device has a secure or locked processor that will only boot signed software that can be authenticated with a pre-loaded production key for confirming that the software is valid, authentic manufacturer-approved software. In operation, the locked processor typically authenticates a bootloader, i.e. validates the signature on the bootloader, and the bootloader then manages the authentication of subsequent software components in a "boot chain", confirming that each distinct software component loaded and run is first validated based on its signature.

Software is often signed by way of a signature applied to a message digest appended to the software image. A hash may be used on the image to generate the digest. The computing device performs the hash on the image to obtain a digest and then uses the stored production key to decrypt the signed digest and compares the decrypted digest with the calculated digest to confirm they match. If so, then the software image is authenticated as unaltered and valid.

Insecure devices are capable of running unsigned software since they feature an unlocked or "insecure" processor; however, the existence of such devices presents a security and management challenge to the vendor.

In accordance with some aspects of the present application, methods are described below in which a computing device manufacturer stores a token on a secure (processor-locked) computing device, and the token indicates what software may be run on the device. In one example, the token may indicate whether pre-release software may be booted on the device. The token may indicate a particular pre-stored key to be used to validate and authenticate the pre-release software, where that pre-stored key is in addition to and different from the normal production key used to validate consumer-ready production software. In some cases multiple pre-release keys may be present on the device, with each key corresponding to a particular user category or role (e.g. developer, internal Beta tester, external Beta tester, carrier evaluator, etc.) or device purpose. The corresponding token must be stored on the device (and validated) in order for the device to use that particular key for authenticating pre-release software. In another example, the token may specify hardware component features (normally blocked) that may be at least temporarily accessed. Various parameters may be specified in the token to govern enablement of the normally-restricted feature.

Example Computing Device

Figure 1:
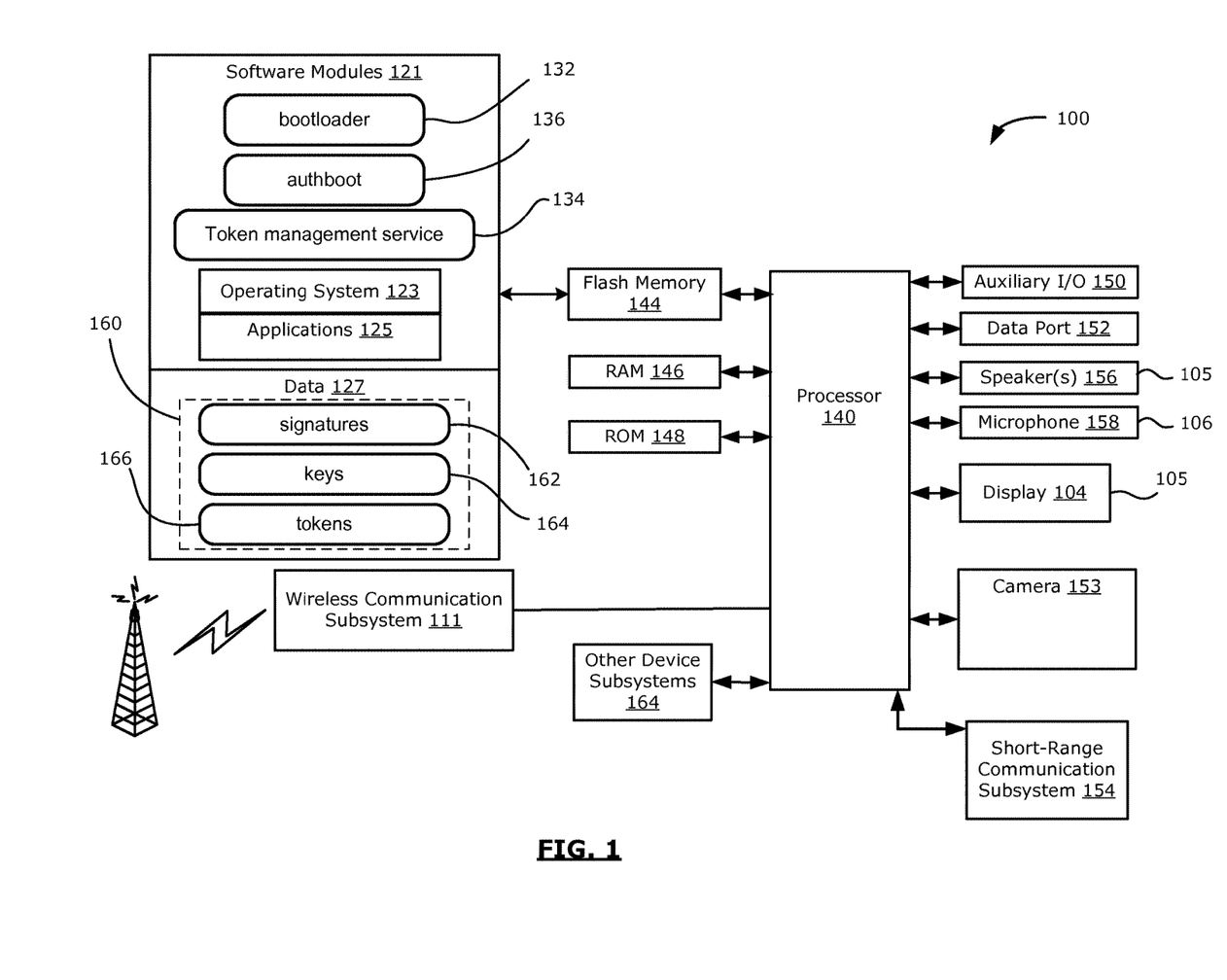
FIG. 1 is a block diagram illustrating components of an example mobile electronic device in accordance with example embodiments of the present disclosure.

Reference is first made to FIG. 1, which shows an example computing device. The computing device in this example is a mobile device 100, such as a smartphone, that is configured to communicate with other electronic devices, servers and/or systems. The example mobile device 100 is portable and may be easily moved between different physical locations. The mobile device 100 may be a device configured for both data and voice communication in some embodiments. The mobile device 100 may be a mobile telephone such as a smartphone, a wearable computer such as a watch, a tablet computer such as a slate computer, a personal digital assistant (PDA), or other such computing device. The computing device may take other forms apart from those specifically listed above and, in some instances, may not be a portable mobile device.

The example mobile device 100 includes a housing containing the components of the mobile device 100. The internal components of the mobile device 100 are constructed on a printed circuit board (PCB). The mobile device 100 includes a controller including at least one processor 140 (such as a microprocessor) which controls the overall operation of the mobile device 100. The processor 140 interacts with device subsystems such as a wireless communication subsystem 111 for exchanging radio frequency signals with a wireless network to perform communication functions. The processor 140 may be communicably coupled with additional device subsystems including one or more output interfaces 105 (such as a display 104 and/or a speaker 156), one or more input interfaces 106 (such as, for example, a camera 153, a microphone 158, a motion sensor 182, a keyboard (not shown), control buttons (not shown), a touch-sensitive overlay (not shown) associated with a touch-screen display and/or other input interfaces 106), memory (such as flash memory 144, random access memory (RAM) 146, read only memory (ROM) 148, etc.), auxiliary input/output (I/O) subsystems 150, a data port 152 (which may be a serial data port, such as a Universal Serial Bus (USB) data port), a short-range communication subsystem 154 and other device subsystems generally designated as 155.

The data port 152 may be used for synchronization with a user's host computer system (not shown). The data port 152 enables a user to set preferences through an external device or software application and extends the capabilities of the mobile device 100 by providing for information or software downloads to the mobile device 100 other than through the wireless network. The alternate download path may for example, be used to load sensitive data onto the mobile device 100 through a direct, reliable and trusted connection to thereby provide secure device communication. For example, the data port 152 may be one path for delivering and installing a token in accordance with one aspect of the present application.

The mobile device 100 stores data 127 in an erasable persistent memory, which in one example embodiment is the flash memory 144. In various example embodiments, the data 127 includes service data including information used by the mobile device 100 to establish and maintain communication with a wireless network. The data 127 may also include user application data such as email messages, address book and contact information, image data, calendar and schedule information, notepad documents, image files, and other commonly stored user information stored on the mobile device 100 by its user, and other data. The data 127 stored in the persistent memory (e.g. flash memory 144) of the mobile device 100 may be organized, at least partially, into one or more databases or data stores. The databases or data stores may contain data items of the same data type or associated with the same application. For example, email messages, contact records, and task items may be stored in individual databases within the memory. The user data may be stored in a user partition of the data 127 area of the flash memory 144.

In addition to the user data, the non-volatile memory (e.g. the flash memory 144) may also store persistent device data in a permanent partition 160 of the memory. The permanent partition 160 may be a restricted area of memory only available to processes with sufficient permission and may have restricted write permissions to prevent unauthorized alteration of the data in the permanent partition 160. This area may store data, such as certain signatures 162 and keys 164 that are not necessarily deleted during a device wipe. In some embodiments, the permanent partition 160 stores one or more tokens 166 in accordance with an aspect of the present application. The tokens 166 may be loaded into the permanent partition 160 in accordance with a token distribution process, one example of which is described further below.

The processor 140 operates under stored program control and executes software modules 121 stored in memory such as persistent memory; for example, in the flash memory 144. As illustrated in FIG. 1, the software modules 121 may include operating system 123 software and other software applications 125. The processor 140 in this examples is a secure (or locked) processor that requires that software be authenticated as having a valid signature before execution.

Three specific software modules are shown for ease of discussion: a bootloader 132 application, a token management service 134, and an authboot 136 application. The bootloader 132 application is a core application for loading and executing software on the device. The processor 140 validates the authenticity of the bootloader 132 (via its signature) and the bootloader 132 then executes and manages the authentication and execution of subsequent software components, whether for the operating system 123 or for other software applications 125. The bootloader 132 may be described as implementing the "bootchain", i.e. the boot sequence of software components, including their validation prior to execution.

The token management service 134 performs various token-related functions, including validation of a token (as will be described further below) and serves as the interface for function requests from various hardware or software components that submit a query regarding the availability of an associated token.

The authboot 136 application has a role in token distribution and installation, as will be described further below.

The software modules 121 or parts thereof may be temporarily loaded into volatile memory such as the RAM 146. The RAM 146 is used for storing runtime data variables and other types of data or information, as will be understood by those ordinarily skilled in the art. Although specific functions are described for various types of memory, this is merely one example, and it will be appreciated that a different assignment of functions to types of memory could also be used.

Security Tokens

Figure 2:
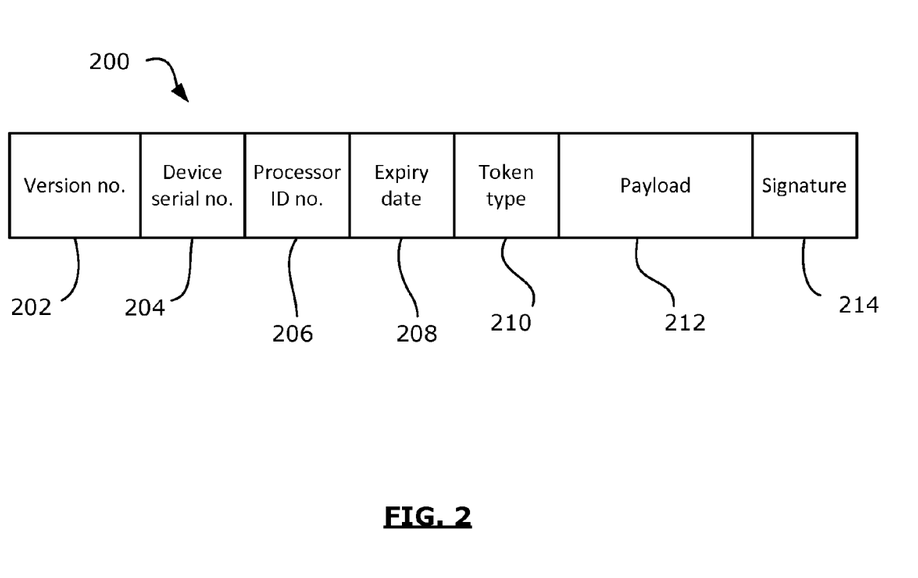
FIG. 2 illustrates an example token structure.

Reference is now made to FIG. 2, which shows one example of a token 166 structure or format. In this example, the token 166 includes fields for a version number 202, a device serial number 204, a processor ID number 206, an expiry date 208, a token type 210, a payload 212, and a signature 214. The version number 202 is a code indicating the version of the token structure/format being used so as to allow for evolutions to the specified structure/format.

The device serial number 204 and processor ID number 206 tie the token 166 to a specific device. This allows the token management service 134 (FIG. 1) and/or the bootloader 132 (FIG. 1) to validate a stored token as belonging to the specific device on which it is installed.

The expiry date 208 field allows for the specification of an expiry date after which the token is no longer valid.

The token type 210 field may specify the type of token. Example types may be a pre-release token that enables the execution of pre-release software, or a specific class of debug token that enables certain functionality for certain hardware or software components. For example, a debug token may be specified for the WiFi chip, the cellular radio, the Bluetooth™ module, the camera, or any other such components. As another example, the debug token may enable certain parameter reporting for debugging, such as permitting access to and export of certain internal parameters, variables or settings of the processor, the memory, or other subsystems of the device that are not normally accessible in a production device. Debug tokens may be used for enabling automatic bug reporting that would otherwise be blocked, or for enabling, for example, carrier test interfaces and applications.

In one embodiment, the token types include an "insecure token". This token type signals that the bootloader is permitted to load and run unsigned software. Such a token effectively unlocks the device making it an insecure device. It will be appreciated that insecure tokens would be closely controlled by the manufacturer and likely installed only on devices used by core developers during development. Advantageously, this enables the manufacturer to build only secure devices and selectively render a subset of them insecure through use of the insecure tokens, rather than building some devices as inherently insecure devices at a hardware level. In some cases, the manufacturer may elect to impose a short expiry period on insecure tokens, thereby ensuring that in the event of a lost or missing "insecure devices" that it would revert to being a secure device quickly.

The payload 212 may specify other parameters or settings that are not already specified by the token type 210 field. For example, the payload 212 may specify certain specific functions that are to be enabled. Specific parameters or settings that are to be applied may also be set out in the payload 212 field.

The signature 214 ensures that the token 166 can be validated by the device as authentic and unaltered.

A device may contain more than one token. As an example, a device may contain a pre-release token entitling the device to run signed pre-release software of a particular type, and may contain one or more debug tokens that enable specific functions or operations for specific components within the device.

Token-Based Control of Software Execution and Operation

Figure 3:
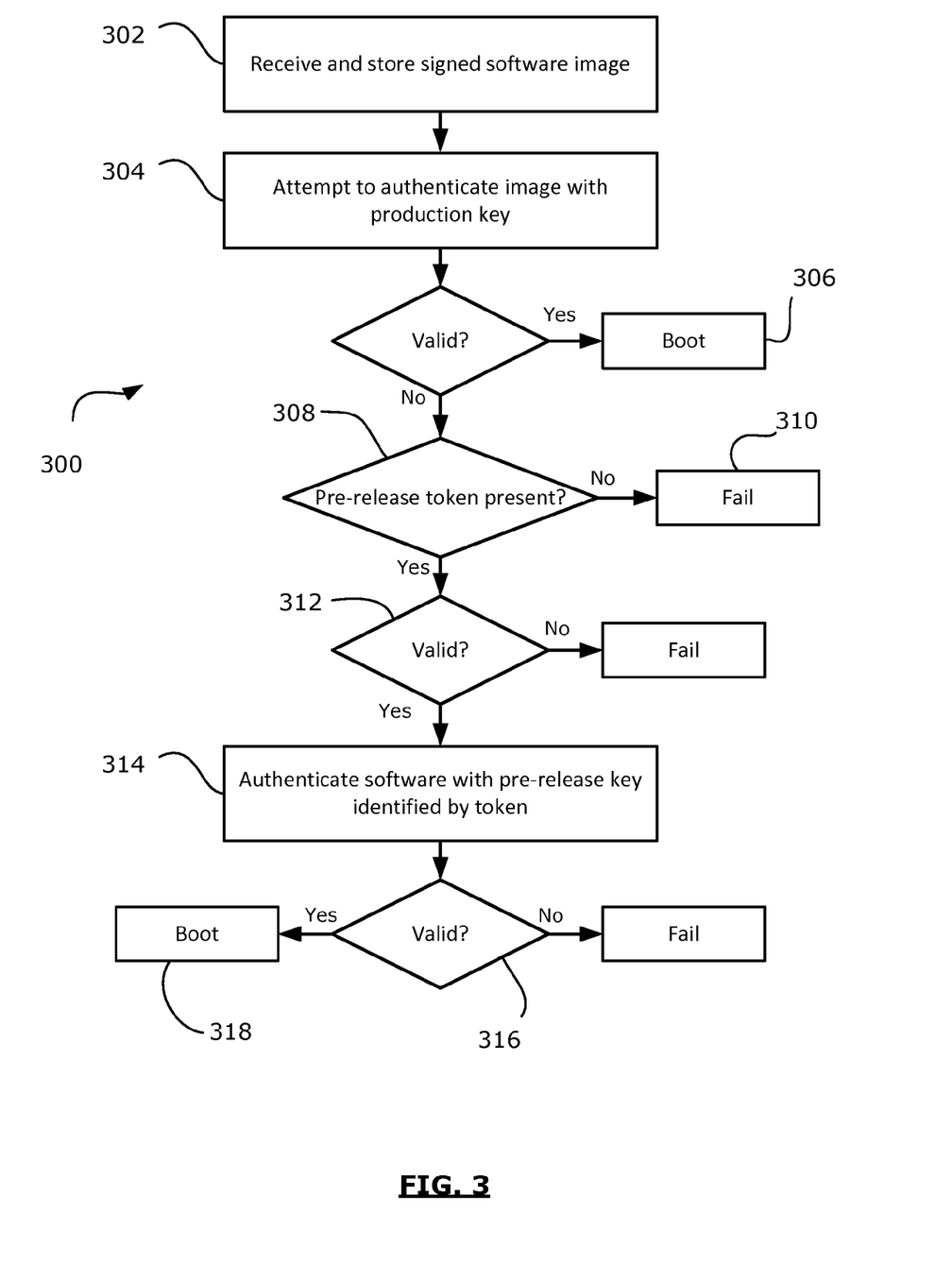
FIG. 3 shows, in flowchart form, one example process for token-based control of software execution.

Reference is now made to FIG. 3, which shows, in flowchart form, one example method 300 of token-based software boot authorization. The method 300 may include an initial operation 302 of receiving and storing a signed software image. It will be appreciated that operation 302 may occur on initial factory installation of software on the device. It may also occur later as part of a software patch or update. It may further include the loading and storage of new software on the device.

Operation 304 occurs when the software is run, either as part of the boot chain during start-up of the operating system or subsequently upon user-initiated launch of the software. Operation 304 includes, at the bootloader 132 (FIG. 1), attempting authentication of the software using the production key. In other words, the bootloader 132 checks the signature appended to the software using the stored production key that is used for validating customer-deployed software.

If the authentication using the production key indicates that the software is valid authentic production software, then the software is permitted to boot in operation 306. This occurs with ordinary customer-deployed software with a valid signature.

If the production key does not result in validation of the software, then the bootloader 132 may determine if a pre-release token is present on the device, as indicated by operation 308. In some embodiments, the bootloader 132 is configured to directly check for a stored pre-release token. In some embodiments, the bootloader 132 generates and sends a request to the token management service 134. The bootloader 132 or the token management service 134, as the case may be, may determine that no such token is stored on the device, in which case the software launch fails, as indicated by operation 310.

If there is a pre-release token present in memory on the device, then the token is validated in operation 312. Validation may include confirming that the token is unaltered by checking its signature. Validation of the signature confirms that the token is unaltered and properly signed. Validation may further include confirming that the token is assigned to this specific device. This may include comparing the device serial number in the token with the serial number of the device, and comparing the processor ID number in the token with the ID number of the processor. If there is a mismatch between these parameters, it may indicate that the token does not belong to this device. Finally, validation may further include checking the expiry date field of the token to confirm that the token has not expired and is therefore still valid.

If the validation check fails, then the software will not be booted. However, if the validation check succeeds, then in operation 314 the bootloader 132 authenticates the signed software image using a prerelease key identified by the token. There may be multiple pre-release keys on the device corresponding to different classes of devices or roles. As an example, there may be a pre-release key corresponding to a developer role, an internal Beta testing role, an external Beta testing role, or a carrier testing role, as examples. The token may specify the role or the name of the pre-release key to be used to authenticate the software image.

As indicated by operation 316, if the software is properly signed by the correct pre-release key identified by the pre-release token, then it will be permitted to boot, as shown in operation 318. Otherwise, it will be blocked from booting.

It will be appreciated that software images may be signed with multiple digests using different keys, so that there are more than one key that may validate a software image. As an example, during initial builds of software-under-development, the images may be signed with a developer key only. As the software matures and is ready for internal Beta testing, then the image could be signed with both the developer key and an internal Beta testing key. Likewise, once a build is ready for external testing it may be signed by the developer key, the internal Beta testing key, and an external Beta testing or carrier evaluation key. Only once the image is ready for customer-release will be signed with the production key making the software available to all of the secured devices.

Figure 4:
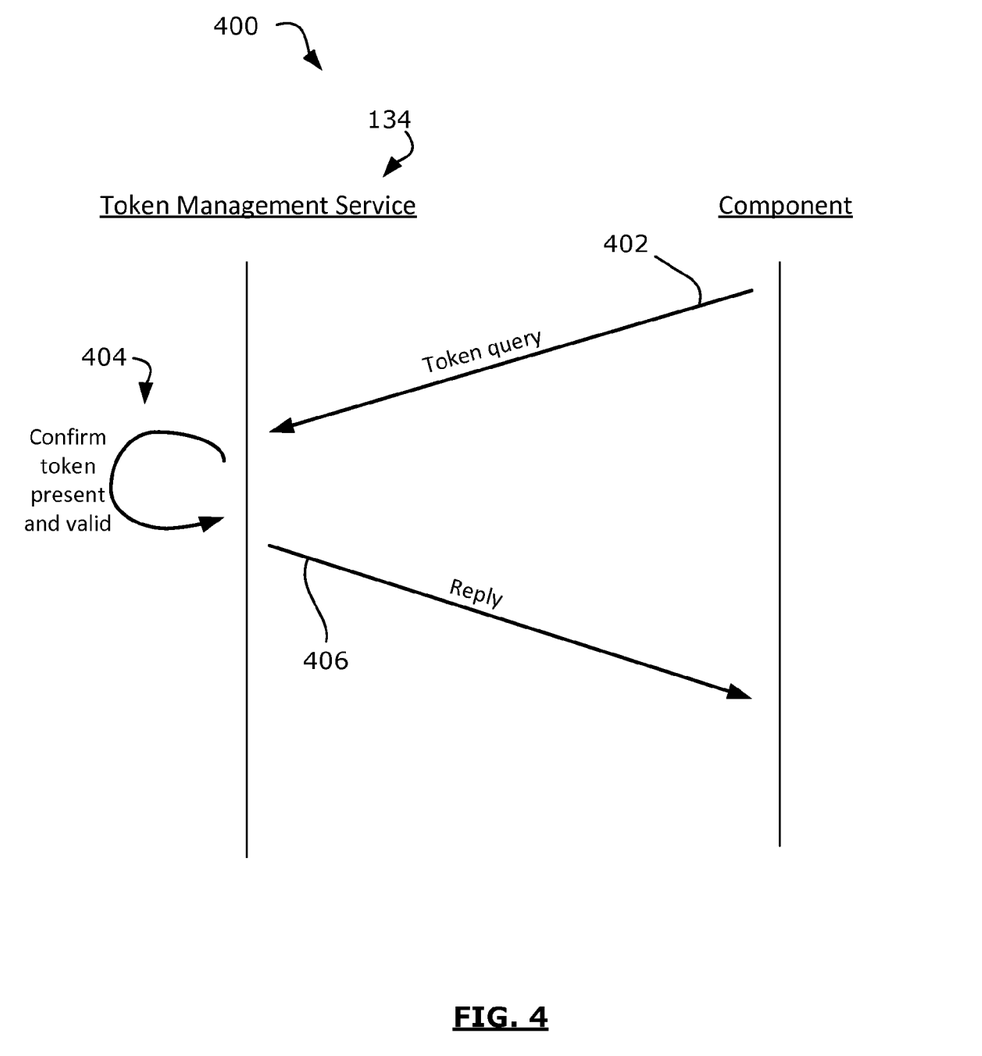
FIG. 4 shows a simplified signal diagram illustrating one example of token-based control of security features.

Reference is now made to FIG. 4, which shows a simplified signal diagram 400 for applying token-based permissions to device components. Individual device components, whether hardware, software or both hardware and software based components, may generate a token request to the token management service 134. The components may include applications, services, or other processes operating on the device. The component may use an application programming interface to generate a token query 402 directed to the token management service 134. The token query 402 may specify the token type being queried. In some embodiments, the token query 402 may further specify specific parameters or settings requested with regard to the token type that is the subject of the query.

The token management service 134, upon receipt of the token query 402, determines whether a corresponding token of the requested type is present on the device and, if so, whether it is valid, as indicated by reference numeral 404. The validation of the token may include confirming that is properly signed, confirming that its device serial number and processor ID correspond to those parameters specified for the current device, and confirmation that the token has not expired.

If the token is of the correct type and is validated, then the token management service 134 sends a reply message 406 to the requesting component. In some embodiments, the reply message 406 may simply indicate whether a valid token of the requested type is present on the device or not. In some embodiments, the reply message 406 may provide additional details or parameters from the token, such as which services or features are indicated as being enabled, and any parameters or settings specified in the token for enabled services or features. The token's payload field may include other information that may be relevant to the component correctly configuring its security settings for particular features or services to enable reduces security access based on the token. Any such information may be passed to the component in the reply message 406.

Token Distribution

Figure 5:
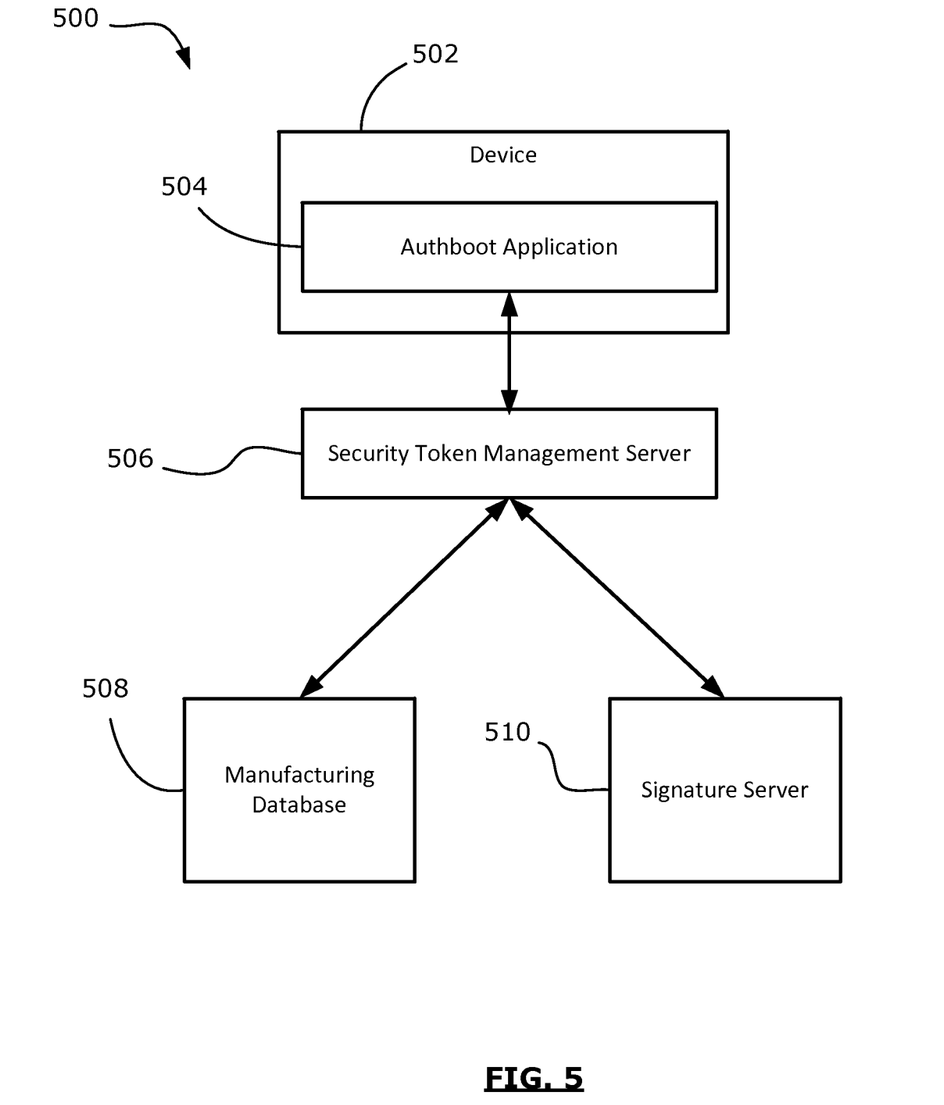
FIG. 5 shows a simplified block diagram of an example token delivery system.
Figure 6:
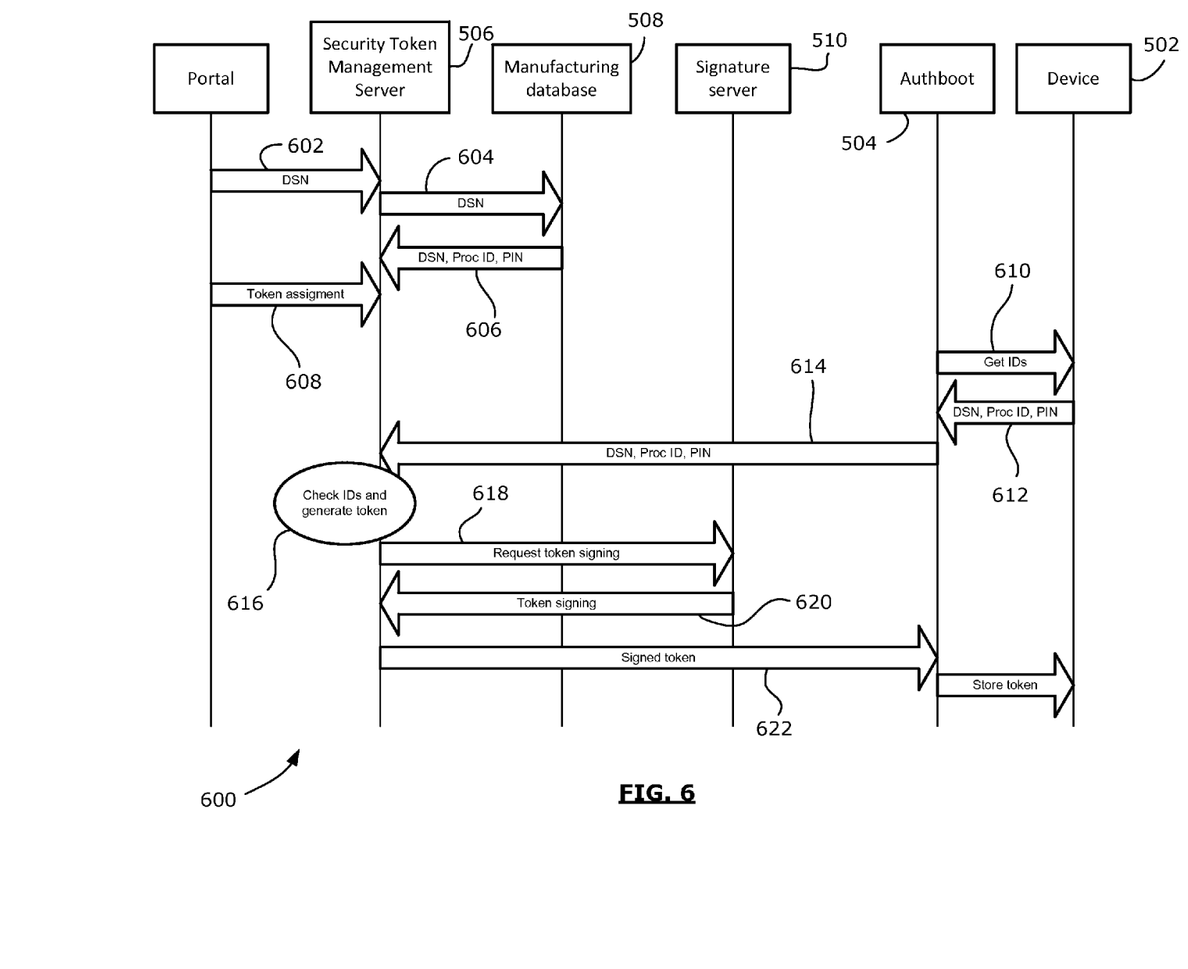
FIG. 6 shows a signal diagram of an example token delivery process.

Reference is now made to FIG. 5, which shows a simplified block diagram of a token delivery system 500, and FIG. 6, which shows a simplified signal diagram of a token delivery process 600. The system 500 includes a secure device 502 having an authboot 504 application. The system includes a security token management server 506 under the control and management of the device manufacturer, which also maintains a manufacturing database 508 and a signature server 510. The manufacturing database 508 stores records of devices serial numbers and corresponding processor ID numbers and other device-identifying information regarding devices produced. The signature server 510 maintains private keys and performs the function of signing tokens and enforcing restrictions on who can request signed tokens.

The security token management server 506 maintains records of "whitelisted" devices; that is, devices that have been authorized to receive a token of a particular token type (and any associated parameters specified during authorization). Whitelisting via the security token management server 506 is only available to users of the server 506 with security credentials that permit whitelisting of devices. In some cases, the interface may permit bulk or group whitelisting based on, for example, a combination of carrier identify and device serial numbers or ranges of device serial numbers.

As shown in the process 600, the registration of the device begins with supplying the board serial number of the device 502 to the security token management server 506, as indicated by operation 602. The security token management server 506 then queries 604 the manufacturing database 508 to confirm the device identity and obtain additional details, including, for example, the processor ID number and, in some examples, a PIN number uniquely identifying the device on the network. Other or different device-identifying parameters may be obtained from the manufacturing database 508. The parameters are returned to the security token management server 506 in operation 606 for storage as part of the device whitelisting registration record.

The authorized user whitelisting the device then also specifies a token assignment 608 for the device. The token assignment record may indicate the token type, the expiry date, and any parameters or settings associated with the token assignment. In some cases, only certain token types may be available to certain authorized users. As an example, the ability to create high-security-risk tokens, such as an "insecure token" may be more restricted than the ability to create lower security risk tokens, such as certain debug tokens or pre-release tokens. The security token management server 506 stores the token assignment record in association with the device.

In this example embodiment, the security token management server 506 does not "push" tokens to devices, thereby rendering them less secure. In this example, after a device has been whitelisted and has had a token assigned, the device must specifically request the token. In operation 610, the authboot 504 application is launched on the device. It requests device-identifying data, such as, for example the device serial number, the processor ID number, and/or the device PIN. These parameters are passed to the authboot 504 application in operation 612 and are forwarded by the authboot 504 application to the security token management server 506 in a token request message 614.

At the security token management server 506, in response to receipt of the token request message 614, the security token management server 506 checks its records to determine if the device identified in the token request message 614 has been whitelisted and if any token records exists for that device relating to previously-undistributed and unexpired tokens. If there is a token assigned to the device awaiting delivery, then the security token management server 506 generates the token record in operation 616 and sends the token record to the signature server 510 in operation 618. The signature server 510 signs the token records and returns the signed token record in operation 620.

The security token management server 506 then replies to the token request message 614 by sending the signed token via a return message 622. The authboot 504 application then stores 624 that signed token in the applicable portion of persistent memory on the device.

Substantially the same process 600 may be used to renew an expired token, provided an authorized user has assigned a renewed token to the device. In some cases, a renewal request may generate a request to the authorized user that enabled delivery of the original token, thereby prompting that authorized user to renew the token assignment, if desirable.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A processor-implemented method of authorizing software execution on a computing device having a processor, the computing device storing a production key associated with software authorized for end-user release and storing a pre-release key associated with software not authorized for end-user release, the method comprising:
   checking, by a bootloader executing on the computing device, a signature appended to an image of the software using the production key to determine whether the software is valid production software;
   in response to determining that the software is not valid production software:
      determining, by the bootloader, that the computing device has stored in memory thereon a pre-release token, the pre-release token including a signature provided by a remote security token management server and containing data uniquely identifying the computing device and identifying the pre-release key;
      verifying, by the bootloader, that the pre-release token is unaltered and properly assigned to the computing device by checking the signature of the pre-release token;
      in response to verifying that the pre-release token is unaltered and properly assigned to the computing device, authenticating, by the bootloader, the signed software image using the pre-release key, wherein authenticating the signed software image using the pre-release key comprises decrypting a signature associated with the software image using the pre-release key to obtain a decrypted image digest, and validating the decrypted image digest;
      in response to determining that the software image is properly signed using the pre-release key, permitting, by the bootloader, execution of the software image; and
      in response to determining that the software image is not properly signed using the pre-release key, blocking, by the bootloader, execution of the software image.

2. The method of claim 1, wherein the pre-release token comprises a data structure having at least one field containing unique device-identifying data, and at least one field containing token type data, wherein the token type data identifies the pre-release key.

3. The method of claim 1, wherein the data uniquely identifying the computing device includes a device serial number, and wherein validating the pre-release token comprises matching the device serial number from the pre-release token to a hard-coded device serial number on the computing device.

4. The method of claim 3, wherein the data uniquely identifying the computing device further includes a processor ID number, and wherein validating the pre-release token further comprises matching the processor ID number from the pre-release token to a hard-coded processor ID number from the processor.

5. The method of claim 1, further comprising determining that the token has not expired based on an expiry date within the token.

6. The method of claim 1, further comprising initial operations of:
   sending a token request to a security token management server; and
   receiving the pre-release token for storage on the computing device.

7. The method of claim 6, further comprising, at the security token management server:
   receiving a whitelist authorization and token assignment for the computing device from an authorized user; and
   in response to the token request,
      confirming that the computing device is associated with the whitelist authorization,
      generating a pre-release token record based on the token assignment, and signing the pre-release token record to create the pre-release token.

8. A computing device, comprising:

a memory storing a production key associated with software authorized for end-user release and storing a pre-release key associated with software not authorized for end-user release;

a bootloader; and a processor configured to execute the bootloader, wherein the bootloader, when executed by the processor,
checks a signature appended to an image of the software using the production key to determine whether the software is valid production software;

in response to determining that the software is not valid production software:

determines that the computing device has stored in memory thereon a pre-release token, the pre-release token including a signature provided by a remote security token management server and containing data uniquely identifying the computing device and identifying the pre-release key, verifies that the pre-release token is unaltered and properly assigned to the computing device by checking the signature of the pre-release token; and in response to verifying that the pre-release token is unaltered and properly assigned to the computing device, authenticates the signed software image using the pre-release key, wherein authenticating the signed software image using the pre-release key comprises decrypting a signature associated with the software image using the pre-release key to obtain a decrypted image digest, and validating the decrypted image digest;

in response to determining that the software image is properly signed using the pre-release key, permits execution of the software image; and in response to determining that the software image is not properly signed using the pre-release key, blocks execution of the software image.

9. The computing device of claim 8, wherein the pre-release token comprises a data structure having at least one field containing unique device-identifying data, and at least one field containing token type data, wherein the token type data identifies the pre-release key.

10. The computing device of claim 8, wherein the data uniquely identifying the computing device includes a device serial number, and wherein the bootloader validates the pre-release token by matching the device serial number from the pre-release token to a hard-coded device serial number on the computing device.

11. The computing device of claim 10, wherein the data uniquely identifying the computing device further includes a processor ID number, and wherein the bootloader further validates the pre-release token by matching the processor ID number from the pre-release token to a hard-coded processor ID number from the processor.

12. The computing device of claim 8, wherein the bootloader further determines that the token has not expired based on an expiry date within the token.

13. The computing device of claim 8, wherein the computing device further includes an authboot application that, when executed, sends a token request to a security token management server, and receives the pre-release token for storage on the computing device.

14. A non-transitory computer-readable medium containing processor-executable instructions for authorizing software execution on a computing device having a processor, the computing device storing a production key associated with software authorized for end-user release and storing a pre-release key associated with software not authorized for end-user release, wherein the instructions, when executed, cause the processor to execute a bootloader which:

checks a signature appended to an image of the software using the production key to determine whether the software is valid production software;

in response to determining that the software is not valid production software:

determines that the computing device has stored in memory thereon a pre-release token, the pre-release token including a signature provided by a remote security token management server and containing data uniquely identifying the computing device and identifying the pre-release key;

verifies that the pre-release token is unaltered and properly assigned to the computing device by checking the signature of the pre-release token; and in response to verifying that the pre-release token is unaltered and properly assigned to the computing device, authenticates signed software image using the pre-release key, wherein authenticating the signed software image using the pre-release key comprises decrypting a signature associated with the software image using the pre-release key to obtain a decrypted image digest, and validating the decrypted image digest;

in response to determining that the software image is properly signed using the pre-release key, permits execution of the software image; and in response to determining that the software image is not properly signed using the pre-release key, blocks execution of the software image.

15. The non-transitory computer-readable medium of claim 14, wherein the pre-release token comprises a data structure having at least one field containing unique device-identifying data, and at least one field containing token type data, wherein the token type data identifies the pre-release key.

16. The non-transitory computer-readable medium of claim 14, wherein the data uniquely identifying the computing device includes a device serial number, and wherein the bootloader validates the pre-release token by matching the device serial number from the pre-release token to a hard-coded device serial number on the computing device.

* * * * *